(12) United States Patent
Anderson et al.

(10) Patent No.: US 11,806,667 B2
(45) Date of Patent: Nov. 7, 2023

(54) PORTABLE MEMBRANE FILTRATION

(71) Applicant: Government of the United States, as represented by the Secretary of the Army, Washington, DC (US)

(72) Inventors: Michael Jeffrey Anderson, Troy, MI (US); Jeremy Stephen Walker, Oakland, MI (US); James Saye Dusenbury, IV, Novi, MI (US)

(73) Assignee: GOVERNMENT OF THE UNITED STATES, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 17/222,443

(22) Filed: Apr. 5, 2021

(65) Prior Publication Data
US 2022/0314168 A1 Oct. 6, 2022

(51) Int. Cl.
*B01D 61/10* (2006.01)
*B01D 61/12* (2006.01)
(Continued)

(52) U.S. Cl.
CPC .......... *B01D 61/025* (2013.01); *B01D 61/10* (2013.01); *B01D 61/12* (2013.01); *B01D 65/02* (2013.01); *C02F 1/008* (2013.01); *C02F 1/441* (2013.01); *B01D 2311/04* (2013.01); *B01D 2311/06* (2013.01); *B01D 2311/246* (2013.01); *B01D 2311/2649* (2013.01); *B01D 2313/18* (2013.01); *B01D 2321/02* (2013.01); *C02F 2209/003* (2013.01); *C02F 2209/03* (2013.01);
(Continued)

(58) Field of Classification Search
CPC .......................... B01D 61/10; B01D 2311/04; B01D 2311/25; B02D 2313/18
See application file for complete search history.

(56) References Cited

U.S. PATENT DOCUMENTS

| 4,801,375 A | 1/1989 | Padilla |
| 5,004,535 A | 4/1991 | Bosko et al. |

(Continued)

FOREIGN PATENT DOCUMENTS

| CN | 201161955 | 12/2008 |
| CN | 202898129 | 4/2013 |

(Continued)

OTHER PUBLICATIONS https://www.driveshaftshop.com/2005-2014-mustang-v6-trans-diff-4-bolt-flange-to-108mm-cv-adapter, last visited Mar. 9, 2021.

(Continued)

*Primary Examiner* — Bradley R Spies
(74) *Attorney, Agent, or Firm* — Daniel E. Hegner

(57) ABSTRACT

A portable filtration system is described. The system may comprise: a mixing portion, comprising: a pump adaptor and a contaminant regulator. The pump adaptor may comprise: an upper plate, a lower plate, and a screen. The screen may axially extend between the upper and lower plates, wherein the upper plate, the lower plate, and the screen define a channel of a mixing chamber. The contaminant regulator may comprise a through-passage coupled to the upper plate, wherein the through-passage is in fluid communication with the mixing chamber.

21 Claims, 8 Drawing Sheets

(51) Int. Cl.
  *B01D 61/02* (2006.01)
  *B01D 65/02* (2006.01)
  *C02F 1/00* (2023.01)
  *C02F 1/44* (2023.01)

(52) U.S. Cl.
  CPC .... *C02F 2209/10* (2013.01); *C02F 2301/043* (2013.01); *C02F 2303/10* (2013.01)

(56) References Cited

U.S. PATENT DOCUMENTS

| | | | |
|---|---|---|---|
| 5,215,656 A * | 6/1993 | Stoneburner | B01D 33/801 |
| | | | 210/393 |
| 5,462,414 A | 10/1995 | Permar | |
| 5,520,816 A | 5/1996 | Keupper | |
| 5,616,595 A | 4/1997 | Chu et al. | |
| 5,628,198 A | 5/1997 | Permar | |
| 5,647,973 A | 7/1997 | Desaulniers | |
| 6,190,558 B1 | 2/2001 | Robbins | |
| 6,231,764 B1 * | 5/2001 | Wilkins | B01D 35/0276 |
| | | | 210/393 |
| 6,520,752 B1 * | 2/2003 | Hosford | B01D 29/682 |
| | | | 415/121.2 |
| 7,632,410 B2 | 12/2009 | Heiss | |
| 8,486,275 B2 | 7/2013 | Wolf | |
| 2002/0020678 A1 * | 2/2002 | Loreno | B01D 35/027 |
| | | | 210/767 |
| 2004/0094470 A1 * | 5/2004 | Jackson | B01D 29/58 |
| | | | 210/411 |
| 2004/0168978 A1 | 9/2004 | Gray | |
| 2005/0016906 A1 | 1/2005 | Gettman | |
| 2005/0139531 A1 * | 6/2005 | Gordon | B01D 29/68 |
| | | | 210/411 |
| 2007/0199875 A1 | 8/2007 | Moorey et al. | |
| 2008/0152522 A1 | 6/2008 | Pearson | |
| 2008/0296224 A1 | 12/2008 | Cook et al. | |
| 2009/0134080 A1 | 5/2009 | Fabig | |
| 2010/0292844 A1 | 11/2010 | Wolf | |
| 2013/0180904 A1 * | 7/2013 | Broussard | C02F 1/004 |
| | | | 210/232 |
| 2014/0183107 A1 | 7/2014 | Meunier | |
| 2017/0152154 A1 | 6/2017 | Saveliev et al. | |

FOREIGN PATENT DOCUMENTS

| | | |
|---|---|---|
| CN | 203593668 | 5/2014 |
| JP | 4113568 | 7/2008 |
| WO | 1998022202 | 5/1998 |
| WO | 2019059526 | 3/2019 |

OTHER PUBLICATIONS (N.d.). Flywheel Couplings, Jaw Couplings & More | Hayes Manufacturing, Inc. https://www.hayescouplings.com/pdf/Engine_Motor%20Adapters%20Catalog.pdf, last visited Mar. 9, 2021.

https://www.idealvac.com/IVP-Motor-Adapter-Leybold-D4/pp/P109951, last visited Sep. 30, 2019.

* cited by examiner

PORTABLE MEMBRANE FILTRATION

GOVERNMENT INTEREST

The invention(s) described herein may be manufactured, used, and/or licensed by or for the Government of the United States of America without payment by the Government of any royalties thereon.

TECHNICAL FIELD

The present disclosure pertains to fluid systems, and more particularly to systems having membranes.

BACKGROUND

Reverse osmosis is a fluid purification process that uses a permeable membrane to separate dissolved solids from potable water. Fluid that is not potable is typically removed from the system as waste fluid.

SUMMARY

According to one non-limiting embodiment of the disclosure, a portable filtration system is described. The system may comprise: a mixing portion that may comprise a pump adaptor and a contaminant regulator, wherein the pump adaptor may comprise: an upper plate; a lower plate, and a screen axially extending between the upper and lower plates, wherein the upper plate, the lower plate, and the screen define a channel of a mixing chamber, wherein the contaminant regulator may comprise a through-passage coupled to the upper plate, wherein the through-passage is in fluid communication with the mixing chamber.

According to another non-limiting embodiment of the disclosure, a portable filtration system is described. The system may comprise: a mixing portion that may comprise: a feed pump, a pump adaptor, a contaminant regulator, an output passage in fluid communication with the feed pump, and a recycle passage in fluid communication with a through-passage of the contaminant regulator; and a membrane portion that may comprise: a filter, a boost pump, a membrane apparatus, a concentrate passage, and an energy recovery apparatus. The pump adaptor may comprise: an upper plate; a lower plate, and a screen axially extending between the upper and lower plates, wherein the upper plate, the lower plate, the screen, and the head of the feed pump define a mixing chamber. The contaminant regulator may comprise the through-passage which may be coupled to the upper plate, wherein the through-passage is in fluid communication with the mixing chamber. The membrane apparatus may comprise a permeate chamber and a concentrate chamber segregated by a membrane, wherein the membrane apparatus is in fluid communication with the feed pump via the filter, the boost pump, and the output passage. The concentrate passage may carry high-pressure concentrate fluid from the concentrate chamber to the energy recovery device, and the recycle passage may carry low-pressure concentrate fluid to the mixing chamber via the contaminant regulator.

According to another non-limiting embodiment of the disclosure, portable filtration system is disclosed. The system may comprise: a pump adaptor, comprising a mixing chamber, an inlet for receiving raw fluid, an inlet for receiving recycled fluid, and an outlet; a feed pump in fluid communication with the outlet of the pump adaptor; a boost pump in fluid communication with the feed pump; an energy-recovery means in fluid communication with the boost pump; and a membrane apparatus comprising a concentrate chamber and a permeate chamber, wherein the concentrate chamber is in fluid communication with the energy recovery means via a concentrate passage, wherein the energy-recovery means is in fluid communication with the pump adaptor via a recycle passage.

DETAILED DESCRIPTION

Figure 1:
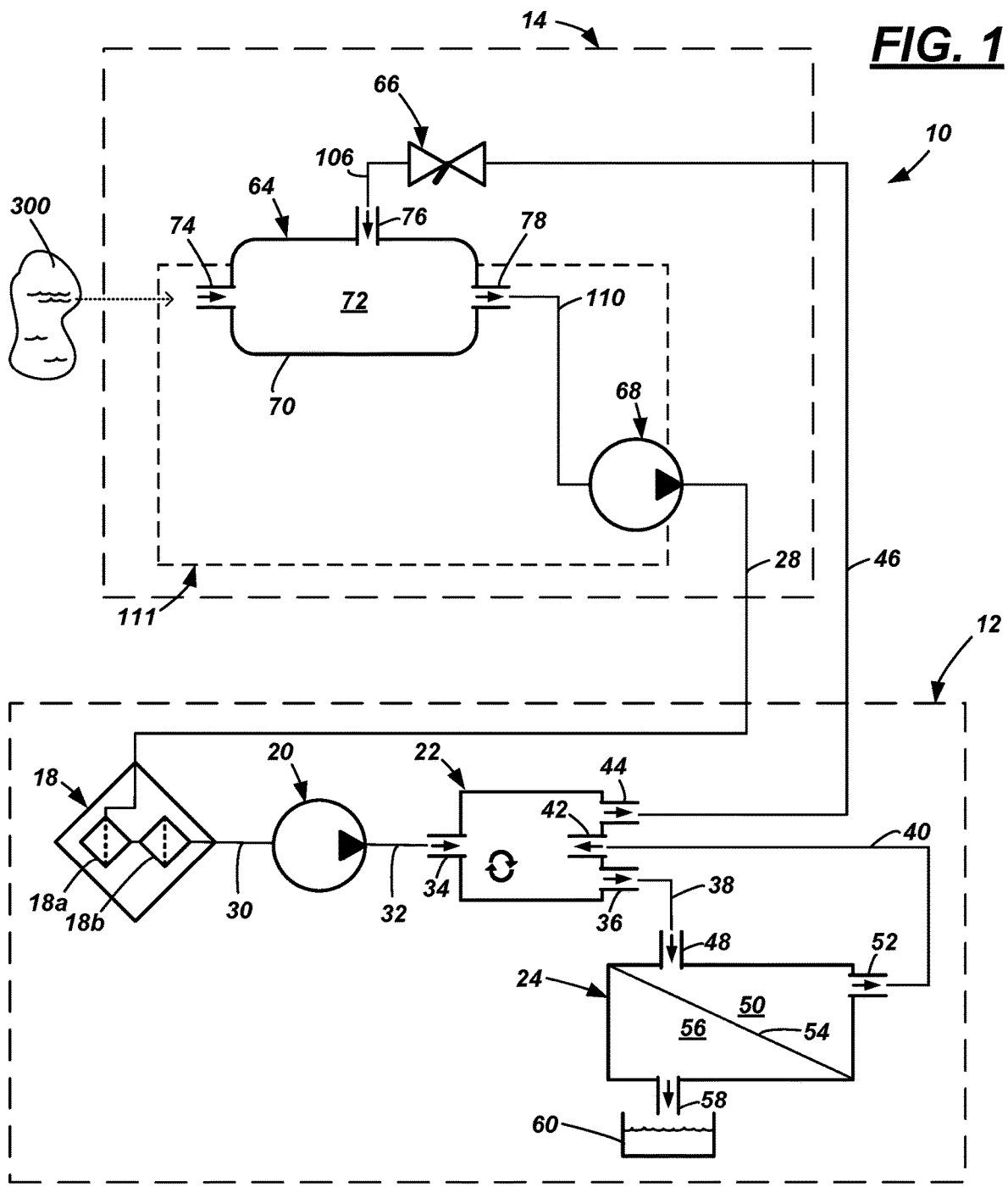
FIG. 1 is a schematic diagram of an embodiment of a portable filtration system illustrating a membrane portion and a mixing portion.

Turning now to FIG. 1, wherein throughout the figures like reference numerals indicate like or similar features or functions, a portable filtration system 10 is disclosed that is used to filter fluids using a membrane. As will be described in greater detail herein and according to one embodiment, the system 10 comprises a membrane portion 12 and a mixing portion 14. The mixing portion 14 may draw and pre-filter a raw fluid from an environmental body of water—e.g., such as a lake, river, puddle, etc. Thereafter, the membrane portion 12 executes a fluid filtration process yielding a permeate fluid (e.g., potable water) and a concentrate fluid (e.g., a fluid comprising contaminants such as particulates, bacteria, salts, chemicals, and/or other dissolved or suspended solids). The membrane portion 12 recycles the concentrate fluid into the mixing portion 14 which then mixes the recycled concentrate fluid with newly-drawn raw fluid. As described more below, the mixed fluids are iteratively processed via membrane portion 12 resulting in a substantial increase of permeate fluid (e.g., per unit volume of raw fluid) without clogging filter(s) of the system 10 with a build-up of contaminants.

According to an embodiment, membrane portion 12 may comprise a filter 18, a boost pump 20, an energy recovery apparatus 22, and a membrane apparatus 24. Filter 18 may receive a pre-filtered fluid from mixing portion 14 via an output passage 28. Filter 18 may be comprised of any suitable material(s) and have any suitable shape or configuration. Filter 18 may remove contaminants smaller than those filtered by mixing portion 14—e.g., contaminants larger than 1 micro-meter (µm) may be filtered. Non-limiting examples of filter 18 include a pleated-, an electrospun-, a string-wound-, or solid block comprised of polymeric materials, activated charcoal, or natural polymers. Such filters are used to remove to some degree biological organisms, dissolved material, and suspended materials such as bacteria, heavy materials, and dirt. According to at least one embodiment, filter 18 may represent multiple filters (e.g., such as illustrated filters 18a, 18b)—e.g., in the case of two or more filters, the filters may be arranged in series wherein one filter is downstream of one another or according to any other suitable arrangement (e.g., filter within a filter).

Boost pump 20 is downstream of and in fluid communication with filter 18—receiving fluid therefrom via a passage 30. Boost pump 20 may be any suitable high-pressure pump—e.g., a non-limiting example of boost pump 20 may be of a positive displacement pump (e.g., non-limiting examples including a rotary vane pump, a gear pump, or a piston pump) or a velocity pump (e.g., non-limiting examples including a centrifugal pump or axial flow pump). According to an embodiment, boost pump 20 may be calibrated to increase a fluid pressure (also referred to herein as 'line pressure') from 5 pounds-per-square inch (psi) to 200 psi. According to at least one example, boost pump 20 increases the pressure of the fluid delivered to energy recovery apparatus 22 (via a passage 32) to 150±50 psi.

Energy recovery apparatus 22 may be a device that: further increases fluid pressure to facilitate filtration via the membrane apparatus 24, captures energy from a fluid exiting the membrane apparatus 24, and uses the captured energy to repeatedly facilitate filtration (e.g., such reverse osmosis, nanofiltration, or the like)—thereby increasing a power efficiency of the system 10. More particularly, energy recovery apparatus 22 increases a fluid pressure of the fluid received via passage 32 (via an inlet 34) and delivers this high-pressure fluid (downstream) to membrane apparatus 24 via an outlet 36 and via a passage 38. Fluid that exits the membrane apparatus 24 (also under high pressure) may be received at the energy recovery apparatus 22 via a concentrate passage 40 and via an inlet 42. And when energy recovery apparatus 22 recaptures energy from the fluid in concentrate passage 40, energy recovery apparatus 22 may output this fluid via an outlet 44 and via a recycle passage 46 (e.g., returning it to mixing portion 14).

Energy recovery apparatus 22 is a non-limiting example of a means for energy recovery. According to one non-limiting embodiment, energy recovery apparatus 22 may be a Clark pump manufactured by Spectra Watermakers, Inc. or may be as described in U.S. Pat. No. 5,628,198 or 5,462,414, each of which are hereby incorporated by reference in their respective entireties. Thus, the Clark pump may be a pump which converts potential energy of a fluid received via concentrate passage 40 (e.g., under relative high pressure) to kinetic energy to increase pressure of the fluid in passage 38 (i.e., of fluid being delivered to membrane apparatus 24). According to a non-limiting example wherein the fluid received at inlet 34 is 150 psi, energy recovery apparatus 22 may increase the fluid pressure in passage 38 to 600-1000 psi. Continuing with this non-limiting example, fluid pressure in concentrate passage 40 may be 1-20 psi less than that delivered to the membrane apparatus 24 in passage 38 (e.g., it may be 580-999 psi). Further continuing with this non-limiting example, following energy recaptured by energy recovery apparatus 22, fluid pressure in recycle passage 46 may be 10-20 psi, and the recaptured energy may offset power demands to pressurize the fluid in passage 38.

In at least one embodiment, the means for energy recovery is a Pearson pump, e.g., such as that shown in International Patent Publication WO1998022202, which is incorporated by reference herein in its entirety. In yet other examples, the means for energy recovery may include systems which employ more or fewer inlets, more or fewer outlets, more or fewer passages (in or out of energy recovery apparatus 22), or a combination thereof. Further, such examples may employ components other than pistons and solenoids to move and recover energy from fluid under pressure.

Membrane apparatus 24 may be any suitable apparatus for filtration that utilizes a membrane to filter fluid, wherein the fluid includes but is not limited to water. Non-limiting examples of membrane apparatus 24 include a reverse osmosis (RO) device (e.g., filtering dissolved or suspended solids greater than 0.1 nanometers (nm)), a nanofiltration device (e.g., filtering dissolved or suspended solids greater than 2-5 nm), or other like device. Membrane apparatus 24 may comprise an inlet 48 to a concentrate chamber 50 and an outlet 52 therefrom, a membrane 54 that defines a boundary between the concentrate chamber 50 and a permeate chamber 56, wherein the permeate chamber 56 comprises an outlet 58 which may empty to an optional tank 60 for storing potable fluid. Inlet 48 and concentrate chamber 50 are in fluid communication with energy recovery apparatus 22 via passage 38, and concentrate chamber 50 and outlet 52 are in fluid communication with energy recovery apparatus 22 via concentrate passage 40. Membrane apparatus 24 may have other features (not shown); such features may be known by those appreciated in the art. In operation, fluid pressure in concentrate chamber 50 may be adequately high to reverse the osmosis process thereby causing a potable fluid to be pressed through membrane 54. As such fluid is pressed through membrane 54, the concentration (parts per million (PPM)) of the contaminants may increase in the concentrate chamber 50. Consequently, this fluid may be circulated to mixing portion 14 via: the concentrate passage 40, the energy recovery apparatus 22, and ultimately the recycle passage 46. As will be discussed below, mixing portion 14 may be configured to regulate contaminant concentration while mixing and recirculating at least a portion of the fluid in the recycle passage 46.

Continuing with the non-limiting example discussed above wherein fluid pressure in passage 38 may be 600-1000 psi, fluid pressure in concentrate chamber 50 may decrease slightly as fluid permeates through membrane 54; e.g., fluid pressure in concentrate chamber 50 may decrease 1-20 psi (e.g., decrease approximately 0.1-3.3% to 580-999 psi). Consequently, in this example, fluid pressure in concentrate passage 40 may be 580-999 psi as well. Fluid pressure in permeate chamber 56 may be 1-10 psi. Other examples also exist—wherein fluid pressure differs in one or more of apparatuses 22, 24 and/or passages 32, 38, 40, 46. Further, skilled artisans will appreciate that other techniques may be employed using membrane apparatus 24.

Turning now mixing portion 14, as described above, mixing portion 14 may be in fluid communication with membrane portion 12. Mixing portion 14 may be upstream of membrane portion 12 as fluid moves from mixing portion 14 to membrane portion 12 via passage 28. And mixing portion 14 also may be downstream of membrane portion 12 as fluid moves from membrane portion 12 to mixing portion 14 via recycle passage 46. According to an embodiment, mixing portion 14 comprises a pump adaptor 64, a contaminant regulator 66, and a feed pump 68.

Pump adaptor 64 may comprise a structure 70 having a hollow region defining a mixing chamber 72, wherein structure 72 comprises an inlet 74 enabling entry of a raw fluid into mixing chamber 72, an inlet 76 in fluid communication with recycle passage 46 thereby enabling concentrate fluid to enter mixing chamber 72, and an outlet 78 to feed pump 68. Mixing chamber 72 may be any suitable size (e.g., 100-5000 milliliters (mL)) and any suitable shape (e.g., a rectangular volume, a cylindrical volume, a spherical volume, just to name a few examples). According to at least one embodiment, the mixing chamber 72 has a size between 100-1100 mL.

Contaminant regulator 66 may be any structural device configured to bleed off at least some of the concentrate fluid to control or regulate the concentration (PPM) of contaminants processed by the system 10. E.g., as discussed above, without contaminant regulation, an excess amount of contaminants will eventually build up and inhibit efficient operation of the system 10. Non-limiting examples of contaminant regulator 66 include a fixed bleed-off component or a variable bleed-off component. As used herein, a fixed bleed-off component may comprise a component comprising at least one inlet opening, a through-passage, at least one outlet opening, and one or more ports of a fixed size, wherein the at least one inlet opening is coupled to a first component of a fluid system (to permit fluid intake) and the at least one outlet opening is coupled to a second component of the fluid system (to facilitate flow thereto), wherein the one or more ports permit fluid to escape the fluid system—e.g., in one embodiment, the one or more ports permit fluid to leak or spray into an environment outside of the system 10 (rejected fluid), whereas fluid that moves from the at least one inlet opening through the through-passage and out the at least one outlet opening may be remain within system 10 (e.g., passing from recycle passage 46 to mixing chamber 72). As used herein, a variable bleed-off component may be similar or identical to a fixed bleed-off component except that the variable bleed-off component further comprises one or more flow control devices that can be used to change a size of the respective port(s)—e.g., in one such embodiment, the flow control device(s) may be valves that control flow, redirection of flow through different ports or passages (e.g., of a manifold), etc. Such flow control devices may be manually-operated or electronically-operated.

Figure 2:
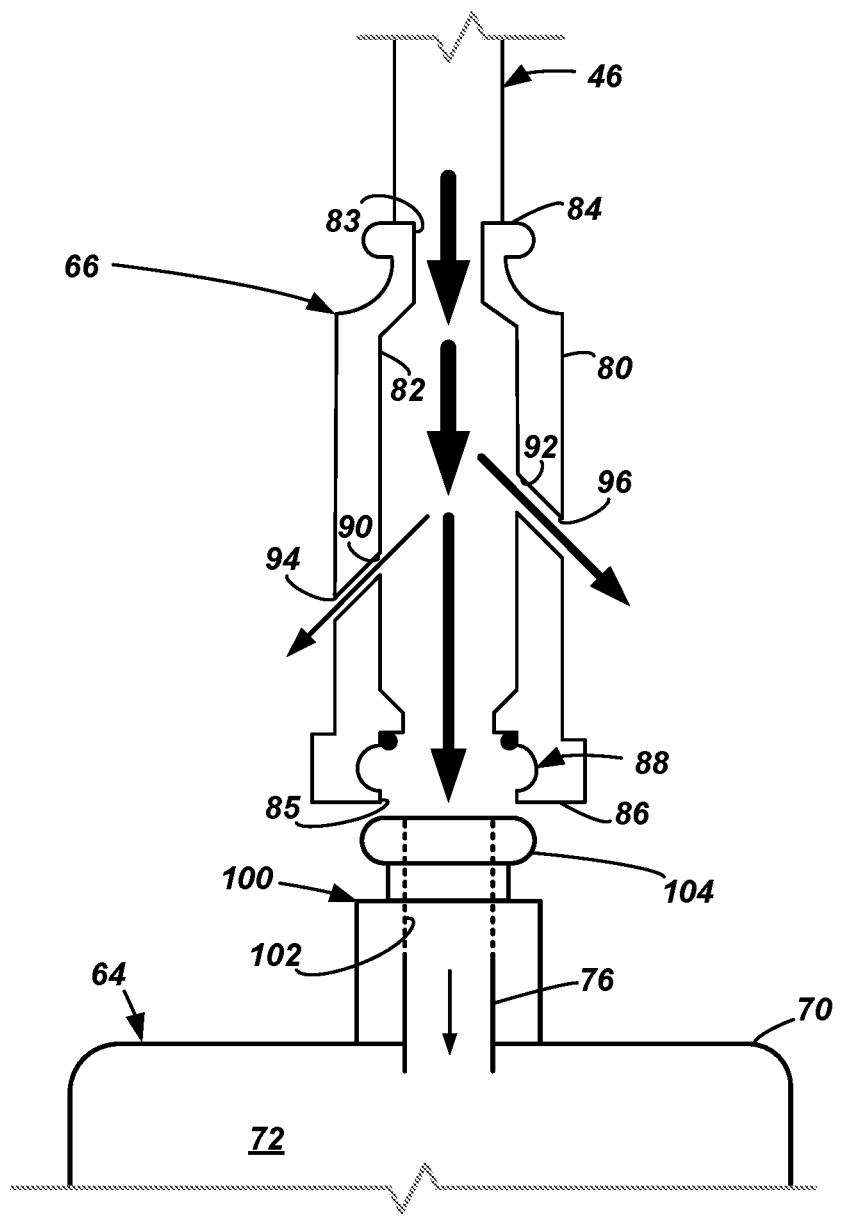
FIG. 2 is a schematic diagram illustrating an example of a contaminant regulator.

FIG. 2 illustrates an example of contaminant regulator 66 embodied as a fixed bleed-off component. According to one example, contaminant regulator 66 comprises an elongated housing 80 having a through-passage 82 extending from an input opening 83 at an end 84 (coupled to recycle passage 46) to an output opening 85 at an end 86 having a quick-disconnect (QDC) feature 88 (e.g., a spring-loaded fluid coupling). Between ends 84, 86, bleed passages 90, 92 extend from through-passage 82 to corresponding ports 94, 96 so that, during operation of system 10, concentrate fluid in recycle passage 46 flows through the through-passage 82 (from input opening 83 to output opening 85 and also through the bleed passages 90, 92 and from corresponding ports 94, 96. Contaminant fluid is thereby bled from contaminant regulator 66 in a controlled manner. E.g., assuming line pressure in recycle passage 46 is constant, contaminant fluid is bled from system 10 at a fixed rate. According to this embodiment (and not intending to be limiting), a nozzle 100 may be coupled to pump adaptor 64 such that nozzle 100 has a passage 102 that facilitates fluid communication between contaminant regulator 66 and mixing chamber 72 via inlet 76. While not required in all examples, nozzle 100 may have a QDC feature 104 that corresponds with QDC feature 88. In other examples, structure 70 itself may comprise such a QDC feature.

The contaminant regulator 66 of FIG. 2 is a fixed bleed-off component. That is, the bleed passages, 90-92 and the ports 94, 96 are a fixed size. Such a contaminant regulator may be selected from a set of contaminant regulators based upon a predetermined bleed rate, each contaminant regulator having differently sized bleed passages and/or ports. An example of selecting contaminant regulator 66 based on bleed rate is described below.

Returning to FIG. 1, in general, contaminant regulator 66 is in fluid communication with recycle passage 46 and inlet 76 (to mixing chamber 72). E.g., in some embodiments, an optional passage 106 may fluidly couple contaminant regulator 66 to inlet 76; however, in at least one example, contaminant regulator 66 is mechanically coupled to structure 70 of pump adaptor 64 and in direct fluid communication with inlet 76. And in at least one example (as shown in FIG. 2), contaminant regulator 66 is mechanically coupled to nozzle 100 and in direct fluid communication with inlet 76. As used herein, 'direct fluid communication' may mean there are no intermediate components through which fluid may flow; correspondingly, 'indirect fluid communication' may mean that at least one intermediate component may be located between two components said to be in fluid communication. Thus, as used herein, 'fluid communication' may refer to direct fluid communication or indirect fluid communication.

FIG. 1 also illustrates feed pump 68 in fluid communication with mixing chamber 72 via outlet 78 and a passage 110. Feed pump 68 may comprise any suitable pumping device to draw raw fluid through pump adaptor 64 and deliver fluid to membrane portion 12. In at least one embodiment, feed pump 68 is a positive displacement pump; however, this is not required. A non-limiting commercial example of feed pump 68 is the SDS-Q-130 manufactured by Sun Pumps, Inc.

FIG. 1 also illustrates that mixing portion 14 may comprise a pre-filter 111 that at least partially encloses pump adaptor 64 and feed pump 68. Pre-filter 111 may be any suitable filter that filters out large particles such as silt, sand, organic matter, etc. Pre-filter 111 may have any suitable shape and size. Further, pre-filter 111 may be made of any suitable materials. Non-limiting examples of suitable material include any suitable plastic(s), natural fiber(s), and/or paper (e.g., fabrics, sheets, or other bags). In at least one example, pre-filter can be removed and either cleaned or replaced with a new pre-filter should the pre-filter become excessively clogged or should it deteriorate.

Thus, in operation, system 10 may draw a raw fluid through the pre-filter 111 into mixing chamber 72. Thereafter, feed pump 68 may draw fluid from mixing chamber 72 and pump it to filter 18 via passage 28. Boost pump 20 may increase the fluid pressure after the fluid passes through filter 18. And subsequently, energy recovery apparatus 22 may increase the fluid pressure additionally. Membrane apparatus 24 may receive this high pressure fluid from energy recovery apparatus 22 and permeate fluid may be collected within permeate chamber 56 after such fluid passes through membrane 54. Fluid which does not pass through the membrane 54 may exit the membrane apparatus 24, returning to energy recovery apparatus 22 via a concentrate passage 40 and there be de-pressurized. During this process, as described above, energy recovery apparatus 22 may use the energy recaptured during de-pressurization to power the pressurization of incoming fluid from boost pump 20. Once de-pressurized, concentrate fluid may exit the energy recovery apparatus 22 and return to the mixing portion 14 via recycle passage 46. Before entering mixing chamber 72 (and mixing with incoming raw fluid), some concentrate fluid may be removed from the system 10 via contaminant regulator 66—e.g., by bleeding some of the concentrate fluid off. Determining how much to bleed off may be based on the contaminants and contaminant PPM in the particular raw fluid, as described more below. Concentrate fluid which is not bled off passes into the mixing chamber 72 and mixes with the raw fluid. Feed pump 68 thereafter may pump a mixture of raw fluid and concentrate fluid. It is contemplated that the pumping of raw fluid, the mixing of concentrate fluid and raw fluid, the energy recovery using apparatus 22, the process of reverse osmosis, nanofiltration, or the like, and the bleeding off of some of the concentrate fluid may occur concurrently. For example, feed pump 68 may be operating concurrently with any combination of boost pump 20, energy recovery apparatus 22, membrane apparatus 24, and contaminant regulator 66.

Figure 3:
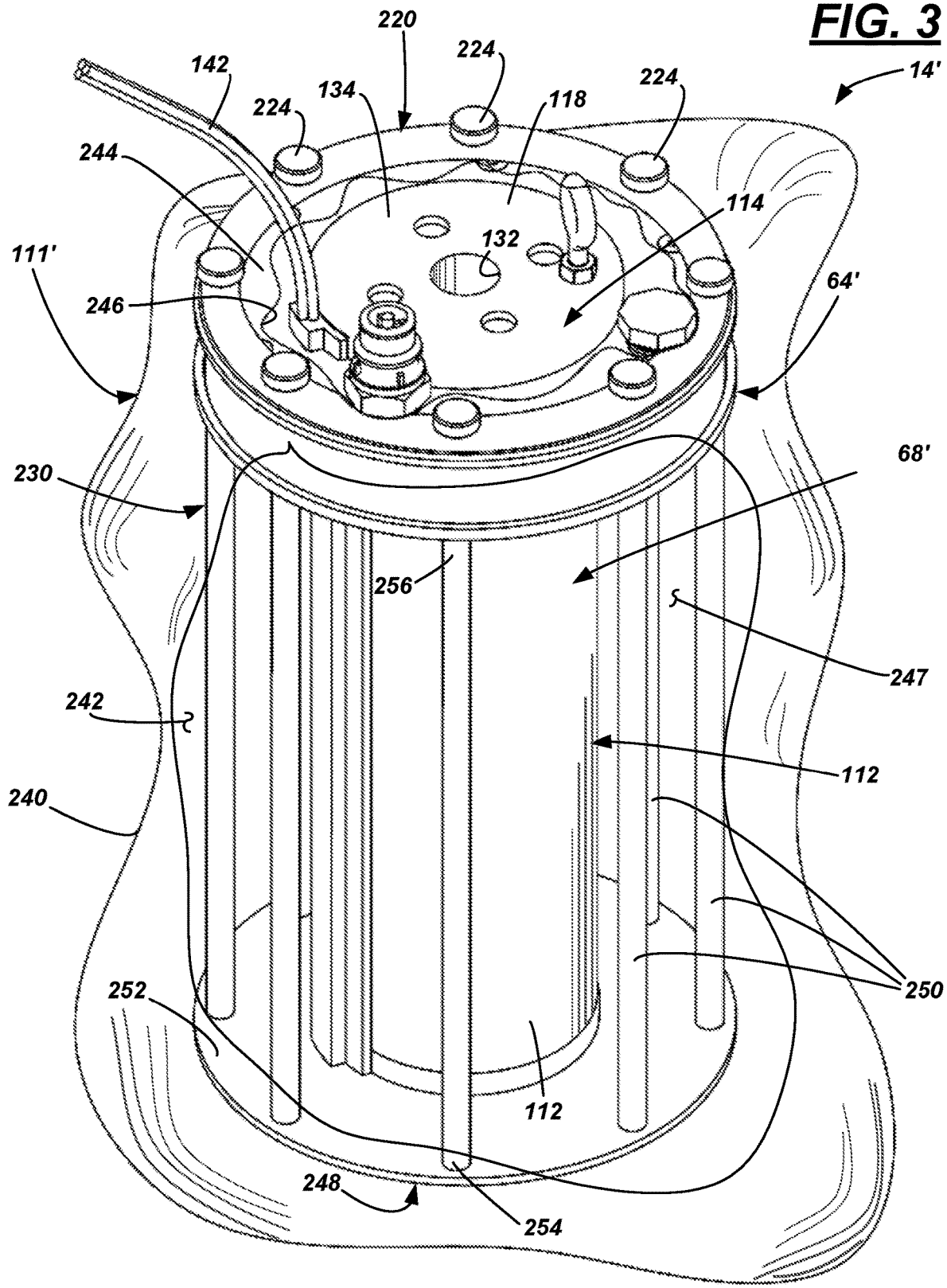
FIG. 3 is a perspective view of an embodiment of a mixing portion.

Turning now to FIG. 3, an embodiment of mixing portion 14 is shown that comprises a feed pump 68', a pump adaptor 64', and a pre-filter 111' which is retained by features of the pump adaptor 68', as described below. It should be understood that this is merely one example; and other feed pump, pump adaptor, and/or pre-filter embodiments also exist.

Figure 5:
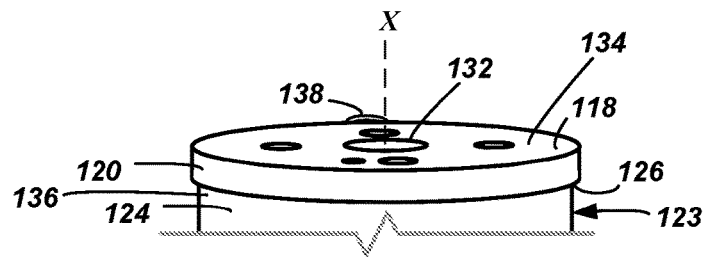
FIG. 5 is a perspective view of a portion of a head of the feed pump shown in FIG. 4.
Figure 4:
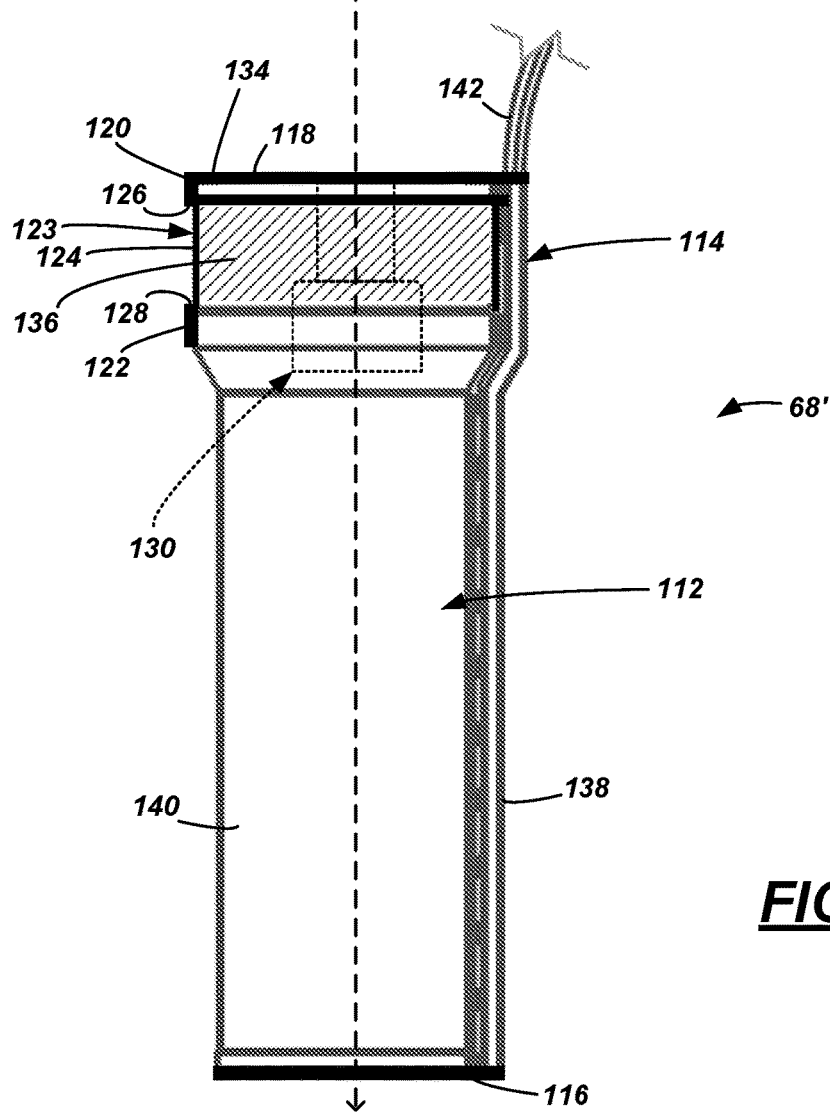
FIG. 4 is a side view of an embodiment of a feed pump.

FIGS. 4-5 illustrate a non-limiting example of feed pump 68' having a longitudinal axis X Feed pump 68' may comprise a body 112 and a head 114 extending axially from the body 112, wherein an axial length of feed pump 68' may be measured from an end 116 (on body 112) to an end 118 (on head 114). Head 114 may comprise a cap 120, a collar 122, and a pump intake 123, wherein the pump intake 123 may be defined by a cylindrical mesh ring 124 axially extending between the cap 120 and collar 122. A diameter of mesh ring 124 may be smaller than the corresponding diameters of cap 120 and collar 122 such that a circumferential flange 126 and a circumferential flange 128, respectively, extend radially outwardly from mesh ring 124.

As shown in FIGS. 3-5, feed pump 68' may comprise a pump mechanism 130 positioned within the body 112, within the head 114, or at least partially within both (in this example, pump mechanism 130 is located within the head 114). A pump outlet 132 may be located at end 118 on cap 120—e.g., extending axially inwardly toward pump mechanism 130 from an outer surface 134. Here, it is centrically located (coaxial with axis X); however, this is not required in all examples. Raw fluid may be in contact with an outer surface 136 of the cylindrical mesh ring 124, and the pump mechanism 130 may draw fluid into pump intake 123 (through mesh ring 124), increase its fluid pressure within pump mechanism 130, and push the pressurized fluid out of pump outlet 132.

In at least one embodiment, feed pump 68' has an axially-extending external protrusion 138 that extends radially outwardly from an outer surface 140 of the feed pump 68' (e.g., across at least a portion of body 112 and head 114). Protrusion 138 may have features to retain electrical wiring 142 which may extend from end 116 and which electrically powers the pump mechanism 130. In this example, wiring 142 may extend axially away from end 118 (as best shown in FIG. 3).

Figure 6:
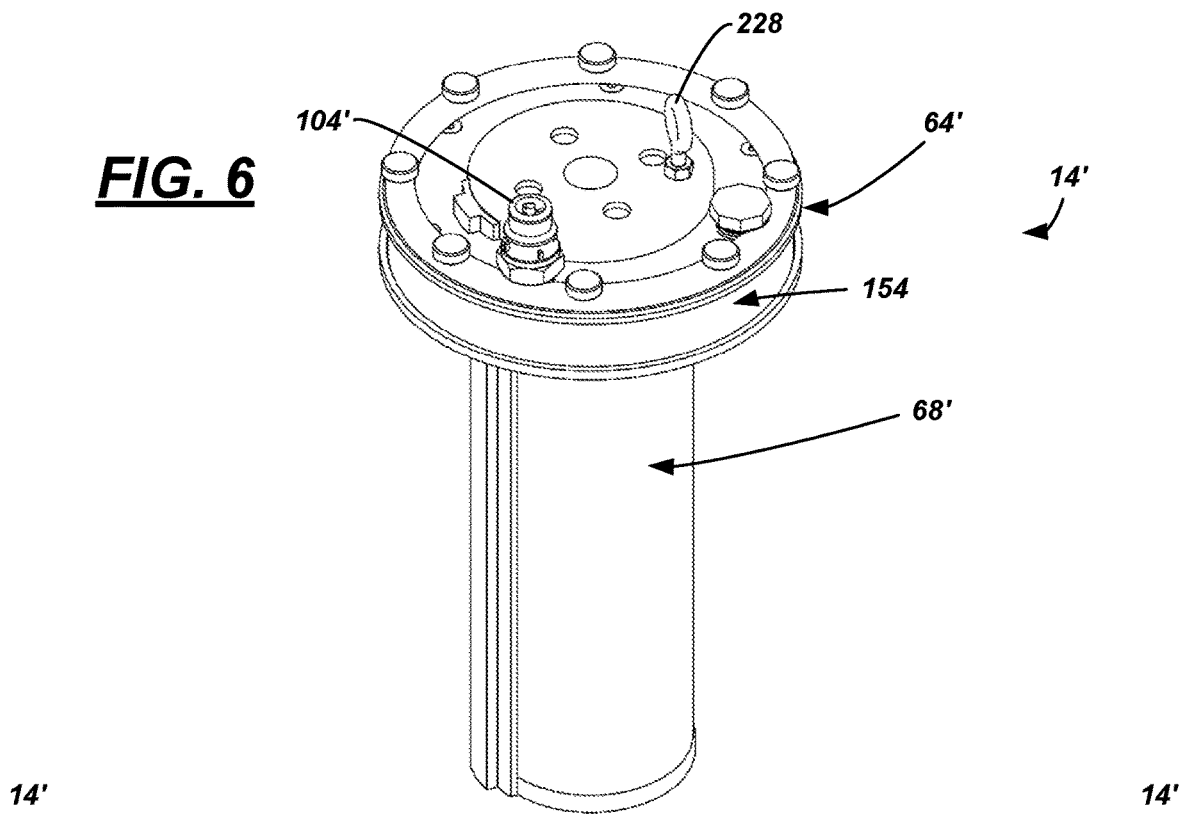
FIG. 6 is a perspective view of the feed pump shown in FIG. 4 coupled to an embodiment of a pump adaptor.
Figure 7:
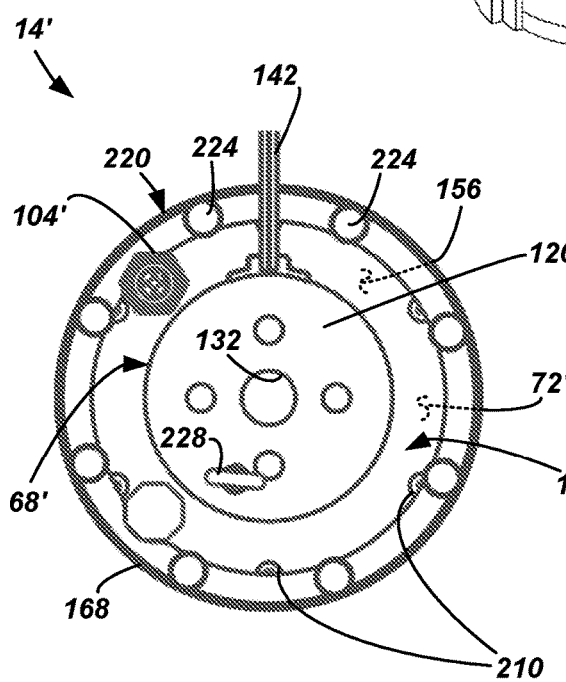
FIG. 7 is a top view of the feed pump and pump adaptor shown in FIG. 6.
Figure 8:
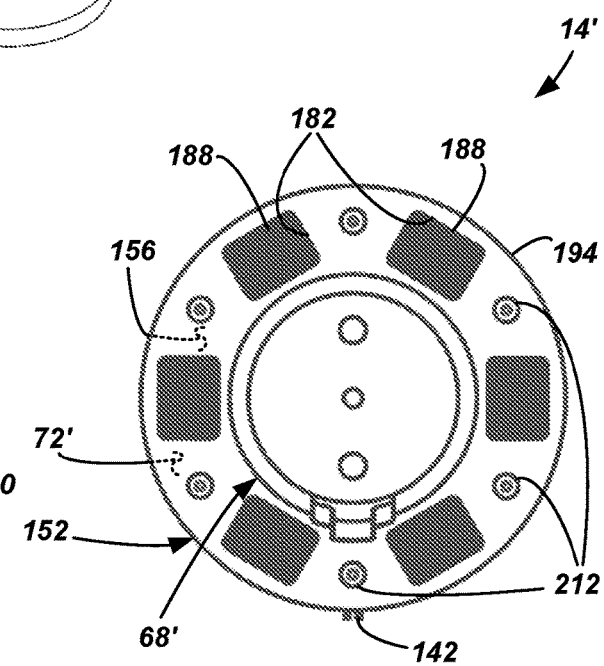
FIG. 8 is a bottom view of the feed pump and pump adaptor shown in FIG. 6.

Now turning to FIGS. 6-8, an embodiment of a mixing portion 14' is shown wherein the pump adaptor 64' illustrated in FIG. 3 is shown mounted to feed pump 68' (e.g., the pre-filter 111' is hidden). FIG. 6 is a perspective view, FIG. 7 is a top view, and FIG. 8 is a bottom view. As described more below, pump adaptor 64' may be extend circumferentially and radially outwardly from the pump intake 123 of feed pump 68'—e.g., being sandwiched between circumferential flanges 126, 128 of the cap 120 and collar 122, respectively.

Figure 9:
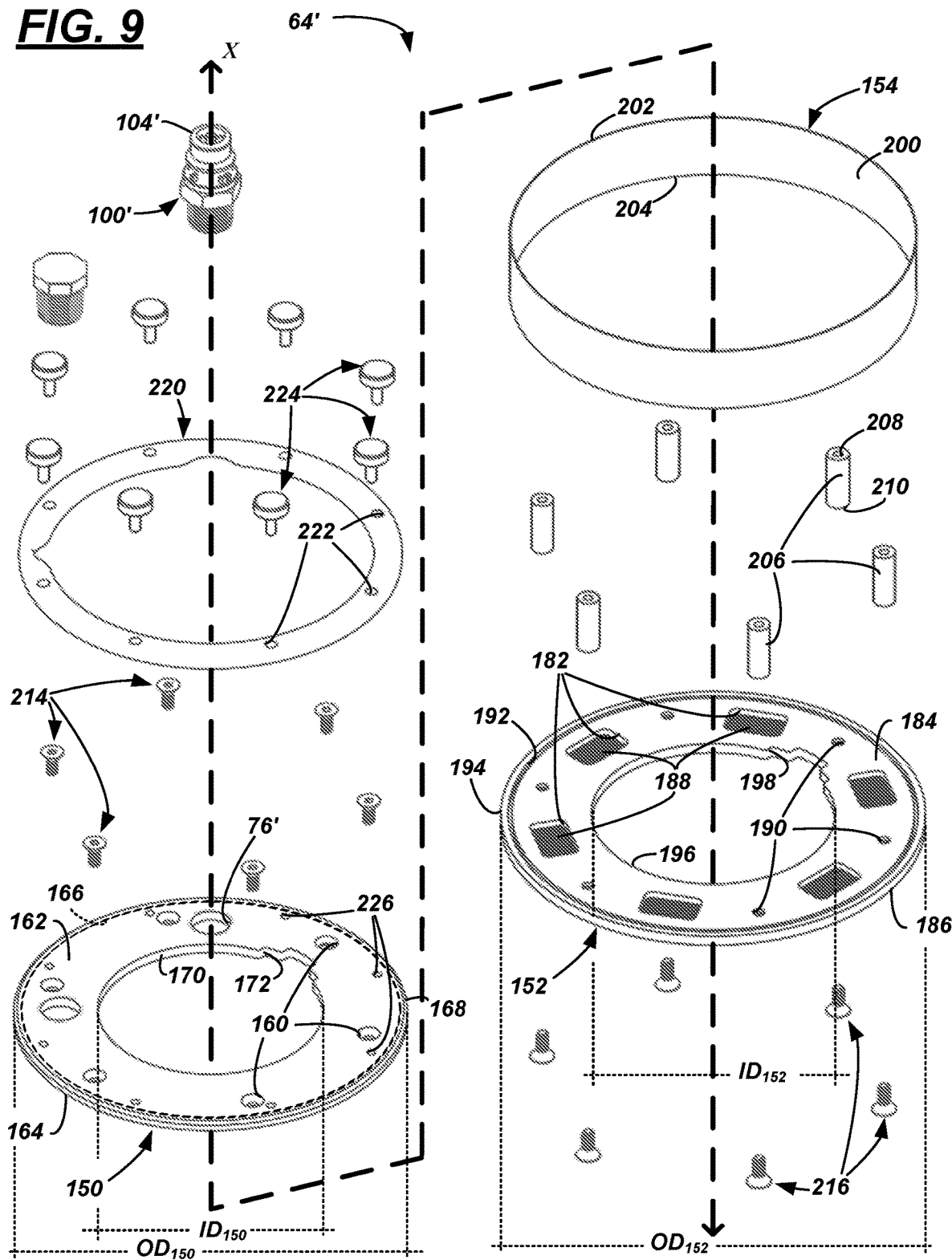
FIG. 9 is an exploded, perspective view of the pump adaptor shown in FIG. 6.
Figure 10:
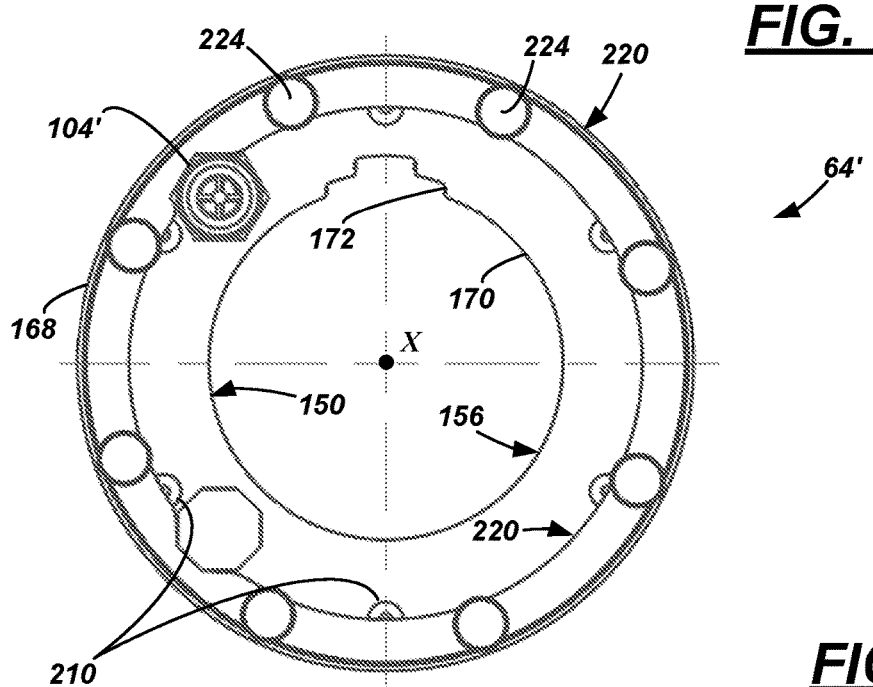
FIG. 10 is a top view of the pump adaptor shown in FIG. 9.
Figure 11:
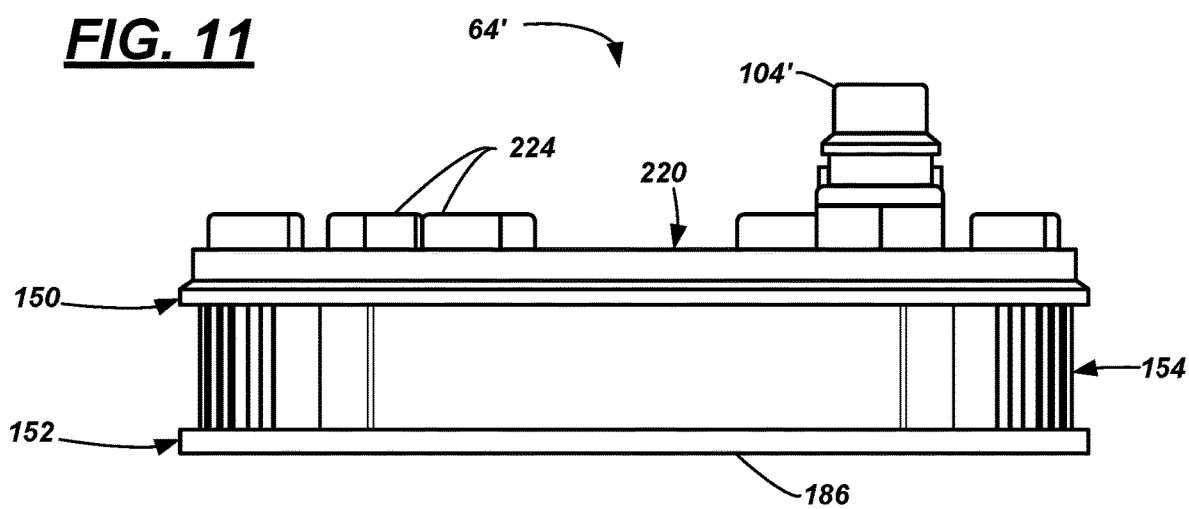
FIG. 11 is a side view of the pump adaptor shown in FIG. 9.

In accordance with FIGS. 6-8 (which show pump adaptor 64' coupled to feed pump 68') and in accordance with FIGS. 9-11 (which show various views of pump adaptor 64' without feed pump 68'), pump adaptor 64' may comprise an upper plate 150 having an annular shape, a lower plate 152 also having an annular shape, and a screen 154 having a ring shape, wherein the screen 154 axially extends between the upper and lower plates 150, 152. The upper plate 150, the lower plate 152, and the screen 154 define a circumferential channel 156 of a mixing chamber 72' (refer to FIGS. 7-8). When assembled with feed pump 68', a volume of mixing chamber 72' is defined by upper plate 150, lower plate 152, screen 154, and the outer surface 136 of mesh ring 124 of feed pump 68' (outer surface 136 shown in FIGS. 4-5).

As best shown in FIG. 9, upper plate 150 may comprise a plurality of circumferentially-spaced holes 160 extending from an upper surface 162 to a lower surface 164 thereof. Lower surface 164 may comprise a circumferential channel 166 (shown in phantom) inboard of an outer edge 168 of the upper plate 150 that is used to retain the screen 154, as described below. The outer edge 168 may define an outer diameter ($OD_{150}$) of the upper plate, and an inner edge 170 of the upper plate 150 may define an inner diameter ($ID_{150}$) thereof. As best shown in FIG. 9, the inner edge 170 may comprise a key 172 having a shape which corresponds with external protrusion 138 of feed pump 68'; thus, when assembled to feed pump 68', key 172 may inhibit rotation of pump adaptor 64' with respect to feed pump 68'.

Upper plate 150 may comprise at least one inlet 76'. Inlet 76' may comprise a through-hole positioned between the inner and outer edges 170, 168. In at least one example, an inner surface of inlet 76' has threads sized to receive a nozzle 100' which has a quick-disconnect connector (QDC) feature 104' (e.g., similar to that shown in FIG. 2). Nozzle embodiments other than that shown may be used as well. In the illustrations, a threaded second inlet is also shown (having a plug with corresponding threads); however, this is not required.

Turning now to the lower plate as best shown in FIG. 9, lower plate 152 may comprise a plurality of circumferentially-spaced apertures 182 extending from an upper surface 184 to a lower surface 186 thereof. A secondary screen 188 may be located within each of the plurality of apertures 182, and these secondary screens 188 may further promote intake of raw fluid (e.g., when mixing portion 14' is laying on its side, and intake through screen 154 is at least partially obstructed or otherwise inhibited due to mixing portion 14' resting in sand, silt, mud, etc.). Each secondary screen 188 may comprise similar or identical material and construction as that of screen 154, as described below.

Additionally, lower plate 152 may comprise a plurality of circumferentially-spaced holes 190 extending from upper surface 184 to lower surface 186. While not required, these circumferentially-spaced holes 190 may be interstitially-located between the circumferentially-spaced apertures 182, as illustrated. On lower plate 152, upper surface may comprise a circumferential channel 192 inboard of an outer edge 194 of the lower plate 152 that also is used to retain the screen 154, as described below. The outer edge 194 may define an outer diameter ($OD_{152}$) of the lower plate, and an inner edge 196 of the lower plate 152 may define an inner diameter ($ID_{152}$) thereof. Inner edge 196 also may comprise a key 198 having a shape which corresponds with external protrusion 138, as shown in FIGS. 8-9.

Screen 154 may comprise a ring body 200 of perforated material axially extending from an upper edge 202 to a lower edge 204. The material may be mesh or the like—being suitable to filter incoming raw fluid. According to one non-limiting example, screen 154 may filter particles larger than 0.018" (approximately 450 μm). In at least one example, mesh size of ring body 200 may be the same as or similar to that of the mesh ring 124 of feed pump 68' (e.g., within a range of 400 μm to 600 μm (or 30-40 sieve size), in accordance with U.S. Sieve Size); however, this is not required. A diameter of screen 154 may correspond with circumferential channels 166, 192 of the upper and lower plates 150, 152, respectively. Upper and lower edges 202, 204 of screen 154 may fit within channels 166, 192, respectively, so that the upper and lower plates 150, 152 retain the screen 154 in place during operation.

Pump adaptor 64' further may comprise a plurality of supports 206 which have an axial length that correspond with an axial length of the screen 154. In at least one embodiment, each support 206 is elongated and has a blind and threaded hole at each end 208, 210. Support examples exist other than those illustrated. Additionally, pump adaptor 64' may comprise a first set of fasteners 214 and a second set of fasteners 216. The first set of fasteners 214 may extend through each of the plurality of circumferentially-spaced holes 160 in upper plate 150 and be threaded into an end 208 of a respective support 206. Similarly, the second set of fasteners 216 may extend through each of the plurality of circumferentially-spaced holes 190 in lower plate 152 and be threaded into an end 210 of a respective support 206. In this manner, upper and lower plates 150, 152 may be compressed toward one another without damaging screen 154 as supports 206 bear the load.

Pump adaptor 64' further may comprise an annular retention ring 220 used to retain pre-filter 111', as described more below. More particularly, retention ring 220 may have a plurality of circumferentially-arranged holes 222. Fasteners 224 may pass through corresponding holes 222 and into a plurality of corresponding blind holes 226 on upper surface 162 of upper plate 150.

In some embodiments of pump adaptor 64', a second inlet (through-hole) may be provided in upper plate 150 (e.g., also having a threaded inner surface). In the illustrated example, a plug is provided to seal this second inlet. In other examples, a second recycle passage could be coupled thereto. The second inlet and plug are optional.

The upper plate 150, lower plate 152, screen 154, supports 206, retention ring 220, and various fasteners 214, 216, 224 may be comprised of any suitable chemically-resistant material such as 316 Stainless steel, titanium, surface-protected aluminum, or the like.

To assemble pump adaptor 64' to feed pump 68', the upper plate 150, the lower plate 152, and screen 154 may be assembled using the supports 206 and fasteners 214, 216. Thereafter, the cap 120 of feed pump 68' may be removed enabling the upper and lower plates 150, 152 to be slid over the mesh ring 124 so that keys 172, 198 align with external protrusion 138 of feed pump 68'. Thereafter, the cap 120 may be replaced. (While not previously described, cap 120 may be secured or loosened using fasteners located in the circumferentially-located holes extending from outer surface 134 of cap 120.) The size of the inner diameters $ID_{150}$, $ID_{152}$ may correspond with a diameter of the cylindrical mesh ring 124 (of the feed pump 68') sealing channel 156 to mesh ring 124—thereby defining the mixing chamber 72'. Optionally, any suitable sealant may be applied to the outer surface 140 of feed pump 68' near the inner edge 170 (of upper plate 150) and correspondingly near the inner edge 196 (of lower plate 152)—this may inhibit debris from bypassing screen 154 and secondary screens 188 and entering the mixing chamber 72'. When such solids enter the mixing chamber 72', they may accumulate on (and clog) mesh ring 124 (of feed pump 68')—thereby necessitating disassembly and internal cleaning of pump adaptor 64'. The annular retention ring 220 then may be coupled to the upper plate 150 using fasteners 224 (as shown in FIG. 6). FIGS. 6-7 also illustrate that an optional eyelet bolt 228 may be threaded into cap 120 and serve as a strain relief for wiring 142 or as an attachment point for a retrieval device (i.e., a device that may be used to retrieve mixing portion 14' from source 300). FIG. 6 illustrates that an output nozzle 229 also may be coupled to the pump outlet 132.

Nozzle 229 may be coupled to passage 28 (shown in FIG. 1). And recycle passage 46 (which is coupled to contaminant regulator 66) may be coupled to pump adaptor 64'. E.g., QDC feature 88 of contaminant regulator 66 may be coupled to QDC feature 104 of pump adaptor 64'. Note passage 110 shown in FIG. 1 may be optional, as mixing chamber 72' is in direct fluid communication with pump intake 123 of feed pump 68'. Pre-filter 111' may be assembled prior to use as well; a description follows.

Returning to FIG. 3, pre-filter 111' may be a bag filter that envelopes a cage 230 that is coupled to pump adaptor 64'. According to one example, pre-filter 111' may comprise an elongated body 240 having a hollow region 242 therein, wherein the body 240 comprises a lip region 244 at one end. The lip region 244 defines an opening 246 to the pre-filter 111'. As explained more below, the hollow region 242 may be sufficiently large to envelope the cage 230 and at least a portion of the pump adaptor 64'. As described above, the retention ring 220 and fasteners 224 may be used to secure the pre-filter 111' to the pump adaptor 64' by compressing the lip region 244 of pre-filter 111' beneath the retention ring 220 and using the fasteners 224 to retain the lip region 244. In this manner, raw fluid drawn into the mixing portion 14' first passes through pre-filter 111', then through screen 154 and/or the secondary screens 188 (of the pump adaptor 64'), then through the mesh ring 124 (of feed pump 68'), and then into the pump mechanism 130.

FIG. 3 also illustrates a non-limiting example of cage 230 which may protect feed pump 68' from damage. Cage 230 may comprise any suitable structural features which permit fluid to pass therethrough and which also provide rigidity to a predefined interior volume 247 around body 112 of feed pump 68'. In the illustration, cage 230 comprises a base 248 coupled to a plurality of axially-extending stanchions 250, wherein the stanchions 250 are arranged circumferentially around the feed pump 68' and an outer peripheral region 252 of base 248. A proximal end 254 of each stanchion may be coupled to base 248 in the outer peripheral region 252 via any suitable manner (e.g., such as fasteners (not shown)). Similarly, a distal end 256 of each stanchion 250 may abut lower surface 186 of lower plate 152, being coupled to lower plate 152 via any suitable technique (e.g., such as fasteners (not shown)).

Other cage features are also contemplated herein. E.g., while not required, cage 230 could have one or more transverse members which could extend between adjacent stanchions 250.

The embodiment of mixing portion 14' shown in FIG. 3 may be a handheld device in which a human user may place or throw into a body of water to draw water to membrane portion 12. Thus, mixing portion 14' may have a length of wiring 142 and passages 28, 46. According to a non-limiting example, the length may be 20-100 feet. These items may be coupled together to avoid tangling (e.g., using straps, clips, zip-ties, etc.). In at least one embodiment, the wiring 142, passage 28, and recycle passage 46 may be formed in a common assembly; however, this is not required.

The following example illustrates an exemplary use of the mixing portion 14', as well as some engineering data acquired through testing demonstrating an increase in efficiency per unit volume of raw fluid. Accordingly, the instant system particularly may be suitable for arid environments wherein a source 300 of fluid (FIG. 1) may have relatively little volume; of course, any size source 300 may be used.

Figure 12:
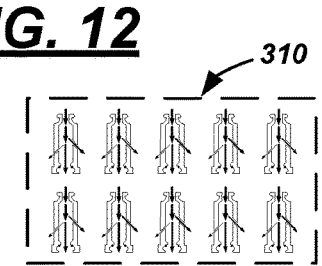
FIG. 12 is a schematic diagram of a set of contaminant regulators, each configured according to a different bleed rate parameter.

The membrane portion 12 of portable system 10 may be on the ground, mounted on a vehicle, or on a vehicle trailer. Typically, the entire system 10 may be a one- or two-man lift (e.g., it may be less than 100 pounds (lb.)). To use the system 10, a user may measure a concentration of dissolved solids in source 300. According to a non-limiting example, based on this measurement, the user may select an appropriate contaminant regulator 66 from a set of contaminant regulators 310 (FIG. 12) (e.g., a plurality of contaminant regulators each having a different bleed rate parameter). E.g., each the contaminant regulators 66 may be fixed bleed-off components corresponding to a unique predetermined bleed rate parameter. In other examples, a variable bleed-off component may be used instead. In at least one embodiment, the system 10 may be adapted to a military or industrial implementation and fixed bleed-off components may be more suitably robust (having fewer moving parts). Table I below illustrates that a predetermined bleed rate parameter may correspond to a concentration parameter (PPM). Accordingly, the user may select contaminant regulator 66 from set 310 that corresponds with the desired bleed rate parameter. As described above, as concentrate fluid is recycled and returned to mixing chamber 72', if some of the concentrate fluid is not bled off, the concentration within the system 10 will increase and eventually inhibit efficient (or any) operation of the system 10 (e.g. without bleed off (i.e., 0% bleed rate parameter), eventually the PPM will increase to infinity).

For purposes of explanation and not to be limiting, consider an embodiment of membrane portion 12 and mixing portion 14' that yields 20% permeate when the bleed rate parameter is 0%. By way of example, conventional reverse osmosis systems reject (e.g., dump as waste) the remaining 80% of source 300 of fluid. By way of example only, Table I illustrates empirical data indicating that 4% to 76% of concentrate fluid may be recycled (depending on the PPM in the source 300), wherein 95% to 5% is bled off, respectively. Through empirical testing of mixing portion 14' it has been determined that as much as 90% yield of permeate fluid may be realized—e.g., as opposed to the mere 20% yield in conventional reverse osmosis systems. For example, regardless of the PPM of the source 300 of fluid, 200 gallons from fluid source 300 yielded 180 gallons of permeate fluid. Per Table I, "Max Start (PPM)" refers to a maximum PPM of the raw fluid entering system 10 (and represented the highest Total Dissolved Solids (TDS) that were introduced to the system 10).

TABLE I

| Bleed Rate (%) | Increase PPM to RO (%) | Max Start (PPM) | Percent Recycled Feed (%) |
|---|---|---|---|
| 0 | ∞ | — | 80% |
| 5 | 464% | 7,543 | 76% |
| 10 | 275% | 12,727 | 72% |
| 15 | 211% | 16,588 | 68% |
| 20 | 179% | 19,553 | 64% |
| 25 | 159% | 22,013 | 60% |
| 30 | 146% | 23,973 | 56% |
| 35 | 137% | 25,547 | 52% |
| 40 | 130% | 26,923 | 48% |
| 45 | 124% | 28,226 | 44% |
| 50 | 120% | 29,167 | 40% |
| 55 | 116% | 30,172 | 36% |
| 60 | 113% | 30,973 | 32% |
| 65 | 111% | 31,532 | 28% |
| 70 | 108% | 32,407 | 24% |
| 75 | 107% | 32,710 | 20% |
| 80 | 105% | 33,333 | 16% |
| 85 | 103% | 33,981 | 12% |
| 90 | 102% | 34,314 | 8% |
| 95 | 101% | 34,653 | 4% |
| 100 | 100% | 35,000 | 0% |

Table II illustrates empirical data demonstrating that filter flow and flow rates of system 10 are not negatively impacted based on recycling concentrate fluid via recycle passage 46 and in accordance with using contaminant regulator 66. More particularly, the turbidity of the fluid in output passage 28 (downstream of mixing chamber 72) remains lower than the turbidity of the source 300 over a time duration. Table II also illustrates that the controlled flow of recycled fluid introduced to the mixing chamber 72' with new raw fluid from source 300 does not cause the conductivity of output passage 28 to spike or exponentially increase. E.g., Table II illustrates a gradual increase in conductivity of source 300 (time 30-135 minutes) and a corresponding increase in conductivity at output passage 28 over the same duration. Consequently, Table II demonstrates that fluid recycled from membrane apparatus 24 may be re-introduce into the mixing chamber 72' without causing instability in the system 10. (Note: abbreviations: "min" refers to minutes, "NTU" refers to Nephelometric Turbidity Units, "µS/cm" refers to micro-Siemens/centimeter, "GPM" refers to gallons per minute, and "GPH" refers to gallons per hour.)

TABLE II

| Time (min) | Source 300 Turbidity (NTU) | Output Passage 28 Turbidity (NTU) | Source 300 Conductivity (µS/cm) | Output Passage 28 Conductivity (µS/cm) | Flow from Feed Pump 68' (GPM) | Pressure after a 1$^{st}$ Filter (18a) (psi) in passage 30 | Pressure after a 2$^{nd}$ Filter (18b) (psi) in passage 28 | Permeate Flow via Outlet 58 (GPH) |
|---|---|---|---|---|---|---|---|---|
| 30 | 29.8 | 24.9 | 289 | 652 | 2.5 | 32 | 34 | 34 |
| 45 | 32.2 | 22.8 | 295 | 666 | 2.5 | 32 | 34 | 34 |
| 60 | 32.4 | 21.6 | 298 | 681 | 2.5 | 32 | 34 | 33 |
| 75 | 32 | 24.1 | 304 | 695 | 2.5 | 32 | 34 | 34 |
| 90 | 27.7 | 22.5 | 309 | 709 | 2.5 | 32 | 34 | 34 |

TABLE II-continued

| Time (min) | Source 300 Turbidity (NTU) | Output Passage 28 Turbidity (NTU) | Source 300 Conductivity (µS/cm) | Output Passage 28 Conductivity (µS/cm) | Flow from Feed Pump 68' (GPM) | Pressure after a $1^{st}$ Filter (18a) (psi) in passage 30 | Pressure after a $2^{nd}$ Filter (18b) (psi) in passage 28 | Permeate Flow via Outlet 58 (GPH) |
|---|---|---|---|---|---|---|---|---|
| 105 | 31.2 | 21.9 | 315 | 715 | 2.5 | 32 | 34 | 34 |
| 120 | 29.4 | 23.9 | 320 | 728 | 2.5 | 31 | 34 | 34 |
| 135 | 29.8 | 25.3 | 326 | 745 | 2.5 | 31 | 34 | 34 |

Other embodiments of system 10 also exist. In at least one embodiment, no additional pump is used between energy recovery apparatus 22 and feed pump 68 or 68'—e.g., along recycle passage 46 to increase fluid pressure through contaminant regulator 66 or to mixing chamber 72 or 72'.

According to another embodiment, one or more ports 94, 96 of contaminant regulator 66 may be directed at pre-filter 111 (or 111'). In this manner, pre-filter 111, 111' may be sprayed and cleaned. Thus, concentrate fluid in recycle passage 46 may remove large debris and particles adhering to an outer surface of pre-filter 111, 111'.

Figure 13:
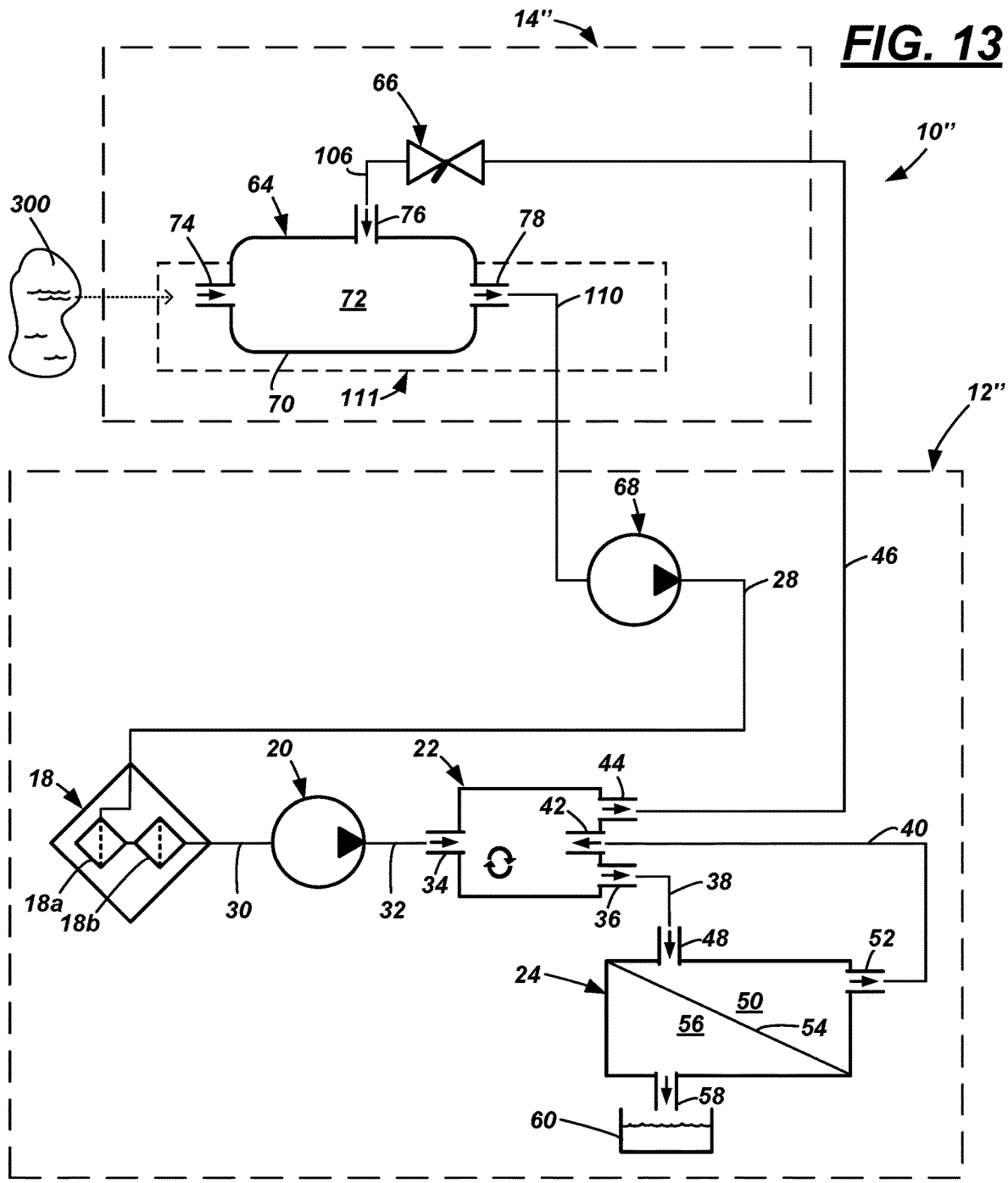
FIG. 13 is a schematic diagram illustrating another embodiment of the portable filtration system.

According to another embodiment, feed pump 68 may not be part of mixing portion 14. FIG. 13 illustrates a portable filtration system 10" showing a membrane portion 12" and a mixing portion 14". Membrane portion 12" includes feed pump 68 and otherwise may be unchanged. Similarly, mixing portion 14" may be identical to mixing portion 14 except that it does not include feed pump 68. In such a case, a user may place or toss mixing portion 14" into fluid source 300 and the system 10' may otherwise operate similarly.

Thus, there has been described a portable filtration system that recycles concentrate fluid. The portable filtration system controls a bleed-off of recycled fluid, increases a yield rate of permeate fluid (e.g., with respect to raw fluid intake), and minimizes the replacement or cleaning of filters therein.

Embodiments of the present disclosure have been described above. It is to be understood, however, that the disclosed embodiments are merely examples and other embodiments can take various and alternative forms. Further, it is contemplated that one or more embodiments may be combined with one another—regardless of whether such various combinations of embodiments are explicitly illustrated in the figures or described in the written description.

The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. In addition, relative terms such as "upper," "lower," "middle," "above," "over," "below," "under," "front," "back," "forward," "rearward," "right," "left," and the like are not intending to be limiting; instead, such terms are used for purposes of illustration and enhancing explanation.

The term coupled may refer to a state of being directly, mechanically coupled or indirectly, mechanically coupled. Indirect couplings may have intermediate parts of components between the two parts or components said to be coupled. Directly coupled may refer to parts or components fastened, attached, or otherwise mated to one another without intermediate components.

What is claimed is:

1. A portable filtration system, comprising:
    a mixing portion, comprising:
        a pump adaptor, comprising:
            an upper plate;
            a lower plate; and
            a screen axially extending between the upper and lower plates, wherein the upper plate, the lower plate, and the screen define a channel of a mixing chamber; and
        a contaminant regulator, comprising a housing having an input opening, an output opening, a through-passage extending between the input and output openings, and at least one bleed passage extending from the through-passage, wherein the contaminant regulator is coupled to the upper plate, wherein the through-passage is in fluid communication with the mixing chamber, wherein the at least one bleed passage is not in fluid communication with the mixing chamber.

2. The portable filtration system of claim 1, wherein the lower plate comprises a plurality of apertures, wherein a secondary screen covers each of the plurality of apertures.

3. The portable filtration system of claim 1, further comprising an axially extending cage coupled to the pump adaptor defining an interior volume, wherein the mixing portion further comprises a pre-filter that comprises a bag filter enveloping the cage and coupled to the pump adaptor.

4. The portable filtration system of claim 3, wherein the pump adaptor comprises a retention ring, wherein a lip region of the bag filter overlays an upper surface of the upper plate and the retention ring overlays the lip region thereby enclosing the screen and the lower plate within the bag filter.

5. The portable filtration system of claim 3, wherein the upper plate has an inner diameter defined by an inner edge, wherein the inner edge comprises a key that inhibits rotation of the upper plate when the upper plate is coupled to a feed pump having an elongated shape that corresponds with a shape of the inner edge.

6. The portable filtration system of claim 5, wherein the mixing portion further comprises the feed pump, wherein the feed pump has a body and a head extending from the body, wherein the head at least partially extends between the upper and lower plates, wherein an outer surface of the head defines a fourth wall of the mixing chamber, wherein the interior volume of the cage is sized to receive the body of the feed pump.

7. The portable filtration system of claim 6, wherein the pump adaptor comprises a retention ring, wherein a lip region of the bag filter overlays an upper surface of the upper plate and the retention ring overlays the lip region thereby enclosing the screen and the lower plate within the bag filter.

8. The portable filtration system of claim 6, wherein the mixing portion further comprises an output passage that extends from the feed pump and a recycle passage that extends from the contaminant regulator.

9. The portable filtration system of claim 8, further comprising a membrane portion that comprises:
   a filter;
   a boost pump;
   a membrane apparatus comprising a permeate chamber and a concentrate chamber segregated by a membrane, wherein the membrane apparatus is in fluid communication with the feed pump via the filter, the boost pump, and the output passage;
   a concentrate passage; and
   an energy recovery apparatus, wherein the concentrate passage carries high-pressure concentrate fluid from the concentrate chamber to the energy recovery apparatus,
   wherein the recycle passage carries low-pressure concentrate fluid from the energy recovery apparatus to the mixing chamber via the contaminant regulator.

10. The portable filtration system of claim 9, wherein the contaminant regulator comprises a quick-disconnect feature facilitating quick-disconnection from the pump adaptor.

11. The portable filtration system of claim 10, wherein the mixing portion further comprises a plurality of contaminant regulators each having a different predetermined bleed rate parameter, wherein each of the plurality of contaminant regulators comprises a quick-disconnect feature.

12. The portable filtration system of claim 9, wherein a line pressure of the recycle passage at an outlet of the energy recovery apparatus corresponds with a line pressure of the recycle passage at the input opening of the contaminant regulator.

13. The portable filtration system of claim 1, wherein the contaminant regulator further comprises one or more ports which facilitate fluid communication between the through-passage and an environment of the mixing portion.

14. A portable filtration system, comprising:
   a mixing portion, comprising:
      a feed pump having an elongated shape and comprising a body and a head extending from the body;
      a pump adaptor, comprising:
         an upper plate;
         a lower plate,
         a screen axially extending between the upper and lower plates, wherein the upper plate, the lower plate, the screen, and the head of the feed pump define a mixing chamber; and
      a contaminant regulator comprising a through-passage coupled to the upper plate, wherein the through-passage is in fluid communication with the mixing chamber;
      an output passage that is in fluid communication with the feed pump; and
      a recycle passage that is in fluid communication with the through-passage of the contaminant regulator; and
   a membrane portion, comprising:
      a filter;
      a boost pump;
      a membrane apparatus comprising a permeate chamber and a concentrate chamber segregated by a membrane, wherein the membrane apparatus is in fluid communication with the feed pump via the filter, the boost pump, and the output passage;
      a concentrate passage; and
      an energy recovery apparatus,
         wherein the concentrate passage carries high-pressure concentrate fluid from the concentrate chamber to the energy recovery device,
         wherein the recycle passage carries low-pressure concentrate fluid to the mixing chamber via the contaminant regulator.

15. The portable filtration system of claim 14, wherein the lower plate comprises a plurality of apertures, wherein a secondary screen covers each of the plurality of apertures.

16. The portable filtration system of claim 14, further comprising an axially extending cage coupled to the pump adaptor defining an interior volume, wherein the mixing portion further comprises a pre-filter that comprises a bag filter enveloping the cage and coupled to the pump adaptor.

17. The portable filtration system of claim 16, wherein the pump adaptor comprises a retention ring, wherein a lip region of the bag filter overlays an upper surface of the upper plate and the retention ring overlays the lip region thereby enclosing the screen and the lower plate within the bag filter.

18. The portable filtration system of claim 14, wherein the contaminant regulator comprises a quick-disconnect feature facilitating quick-disconnection from the pump adaptor.

19. The portable filtration system of claim 14, wherein the mixing portion further comprises a plurality of contaminant regulators each having a different predetermined bleed rate parameter, wherein each of the plurality of contaminant regulators comprises a quick-disconnect feature.

20. A portable filtration system, comprising:
   a pump adaptor, comprising a mixing chamber, an inlet for receiving raw fluid, an inlet for receiving recycled fluid, and an outlet;
   a feed pump in fluid communication with the outlet of the pump adaptor;
   a boost pump in fluid communication with the feed pump;
   an energy-recovery means in fluid communication with the boost pump; and
   a membrane apparatus comprising a concentrate chamber and a permeate chamber, wherein the concentrate chamber is in fluid communication with the energy recovery means via a concentrate passage,
   wherein the energy-recovery means is in fluid communication with the pump adaptor via a recycle passage.

21. A portable filtration system, comprising:
   a mixing portion, comprising:
      a pump adaptor, comprising:
         an upper plate;
         a lower plate; and
         a screen axially extending between the upper and lower plates, wherein the upper plate, the lower plate, and the screen define a channel of a mixing chamber; and
         a contaminant regulator, comprising a through-passage coupled to the upper plate, wherein the through-passage is in fluid communication with the mixing chamber,
   wherein the upper plate has an inner diameter defined by an inner edge, wherein the inner edge comprises a key that inhibits rotation of the upper plate when the upper plate is coupled to a feed pump having an elongated shape that corresponds with a shape of the inner edge.

* * * * *